US007349862B2

(12) United States Patent
Palmer et al.

(10) Patent No.: US 7,349,862 B2
(45) Date of Patent: Mar. 25, 2008

(54) BUSINESS INTELLIGENCE MONITOR METHOD AND SYSTEM

(75) Inventors: Simon James Palmer, Hampstead (GB); Michael John Craig, East Dulwich (GB); Dean Pignon, London (GB); Charles Bailey, Westfield (GB); Grant Miller, Shepherds Bush (GB); Stephen Pollard, Chadderton (GB); Mark Alder, Osgoode (CA)

(73) Assignee: Cognos Incorporated, Ottawa, Ontario (CA)

( * ) Notice: Subject to any disclaimer, the term of this patent is extended or adjusted under 35 U.S.C. 154(b) by 919 days.

(21) Appl. No.: 10/078,793

(22) Filed: Feb. 19, 2002

(65) Prior Publication Data

US 2003/0004742 A1 Jan. 2, 2003

(30) Foreign Application Priority Data

Feb. 19, 2001 (CA) ................................... 2337607

(51) Int. Cl.
G06F 9/44 (2006.01)
(52) U.S. Cl. .......................................... 705/7; 705/10
(58) Field of Classification Search .................. 705/10, 705/7
See application file for complete search history.

(56) References Cited

U.S. PATENT DOCUMENTS

| | | | | |
|---|---|---|---|---|
| 5,189,608 A * | 2/1993 | Lyons et al. | ................... | 705/30 |
| 5,729,743 A * | 3/1998 | Squibb | ........................ | 707/203 |
| 5,778,357 A * | 7/1998 | Kolton et al. | ................... | 707/2 |
| 5,826,237 A * | 10/1998 | Macrae et al. | ................. | 705/2 |
| 5,826,252 A * | 10/1998 | Wolters et al. | ................. | 707/1 |
| 5,832,532 A * | 11/1998 | Kennedy et al. | ............ | 715/503 |
| 5,848,394 A * | 12/1998 | D'Arrigo et al. | .............. | 705/8 |
| 5,907,490 A * | 5/1999 | Oliver | ........................ | 700/90 |
| 5,924,077 A * | 7/1999 | Beach et al. | .................. | 705/10 |
| 6,029,182 A * | 2/2000 | Nehab et al. | ............... | 715/523 |
| 6,070,190 A * | 5/2000 | Reps et al. | .................. | 709/224 |
| 6,405,204 B1* | 6/2002 | Baker et al. | ............. | 705/36 R |
| 6,460,052 B1* | 10/2002 | Thomas et al. | ............ | 707/203 |
| 6,628,765 B1* | 9/2003 | Bangs et al. | ........... | 379/112.01 |
| 2002/0099578 A1* | 7/2002 | Eicher et al. | ................... | 705/7 |

OTHER PUBLICATIONS

"Administrative centralization" by Alan Horowitz, Intelligent Enterprise, Jan. 20, 2000, iss2, p. 54.*
"Intelligent Enterprise magazine Names Business Objects as finalists for 1999 RealWare Awards", Business Wire, Aug. 3, 1999.*

(Continued)

*Primary Examiner*—Romain Jeanty
(74) *Attorney, Agent, or Firm*—Pearne & Gordon LLP (57) ABSTRACT

The present invention is directed to a business intelligence monitor method and system. Business intelligence indicators are monitored by generating a monitoring repository through selecting functions from a collection of functions, for receiving the business intelligence indicators as inputs. The thresholds for the business intelligence indicators are then established to define the states for the business intelligence indicators. Each state of the business intelligence indicators is assigned an associated priority. The monitoring repository is updated by retrieving a current value for each of the business intelligence indicators from a data source, thereby determining the state for each of the business intelligence indicators based on the current value. A report based on the updated monitoring repository is then created.

36 Claims, 5 Drawing Sheets

OTHER PUBLICATIONS

"Business Objects launches Ithena Inc; New Subsidiary Defines First e-customer Intelligence Analytic Applications", Business Wire, Feb. 9, 2000.*

"Business Objects Moves Ahead as Market-Leading e-business Intelligence Platform for Analytical Applications", Business Wire, Jul. 27, 2000.*

"Business Objects Announces BusinessObjects 2000", Business Wire, Jul. 25, 2000.*

"BP Selects Products from Business Objects to Deliver Worldwide e-business Intelligence", Business Wire, Nov. 14, 2000.*

"Proper use of BI Tools can Enhance Your Business", Online Product News, Nov. 1, 2000.* webarchive.com documents for Business Objects and Business Objects 2000 from the year 2000 (13 pages).*

"Intelligent Miner for Data Applications Guide" by Cabena et al, International Technical Support Organization, Mar. 1999.*

"Microsoft Project 2000 and Microsoft Project Central Extend Project Management to a Broader Knowledge Worker Audience", Microsoft PressPass, Nov. 15, 1999.*

"Microsoft Project 2000 extends reach across enterprise", by Heck, Infoworld, Nov. 15, 1999.*

"Microsoft Project 2000 Bible", by Marnel, Published by Hungry Minds Inc, Mar. 2000.*

"Microsoft Project 2000 Feature Guide-Beta", Microsoft Corporation.*

"Special Edition Using Microsoft Project 2000" by Tim Pyron, Que Publisher, Sep. 27, 2000.*

"Mastering Microsoft Project 2000", by Courter et al, Sybex Publisher, Mar. 1, 2000.*

Reinschmidt et al "Business Intelligence Certification Guide", Jan. 2000, International Technical Support Organization, pp. 1-97.*

Reinschmidt et al (Intelligent Miner for Data: Enhance Your Business Intelligence), Jun. 1999, International Technical Support Organization, pp. 1-198.*

* cited by examiner

BUSINESS INTELLIGENCE MONITOR METHOD AND SYSTEM

FIELD OF THE INVENTION

The present invention relates generally to business data management, and more particularly to a method and system to monitor business intelligence data.

BACKGROUND OF THE INVENTION

At the start of each business day, organizations face any number of challenges: to drive innovation, to launch new products, to improve product quality, to create more value for their customers, to develop new markets, to strategically manage human capital, and ultimately, to increase shareholder value. As a result, a typical business database today contains an enormous amount of data in multiple dimensions, presenting a problem for decision makers to acquire and understand relevant business information or "business intelligence data" in a simplified and timely manner.

The entire employee base in an organization must make the decisions that respond to these strategic challenges. And they must make these decisions in a business climate driven by sudden economic or market shifts.

Historically, the metrics that have been used to support these decisions have been financial. Yet a complex business climate demands information that goes beyond financial metrics. It demands forward-looking, or "leading" metrics that can be integrated into a comprehensive performance management environment that can drive future value.

Until now, it has been difficult for companies to move beyond financial metrics to a performance management environment. One of the biggest challenges has been consolidating corporate performance data from disparate sources into centralized, coherent, and trust. Many companies rely on performance data drawn from many different systems: ERP, CRM financial spreadsheets, flat data files, data marts, presentation software, and other sources. Each system provides important information about a particular aspect of the company's performance, but each collects, defines, and displays the information in a different way.

Decision-makers devote great amounts of time, energy, and resources trying to consolidate this data to under-stand and report on their performance. What they often discover in doing this is that their peers have consolidated the data in different ways, each according to their own interpretation of the strategy. Metrics are incomplete, conflicting, or limited to a particular department or function. Sometimes they are all three. Other than key financial metrics (which are well-known and well-defined), decision-makers struggle to obtain a consolidated understanding of performance against corporate strategies and targets.

In these situations, decision-makers often spend more time discussing the validity of numbers than solving performance issues. Without a performance management system that provides a single, unified and consistently defined view of their performance, decision-makers have a great deal of difficulty understanding how the company is performing and have little opportunity to collaborate for effective decision-making.

It has been shown that a company's financial metrics reflected the cumulative effects of only a small proportion of the decisions made within that company, and that its true value could be more accurately evaluated and increased by measuring the effect of decisions made at every level and throughout the company. They asserted that it was in the interplay of people, processes, and other intangible assets that the next competitive advantage was to be found. To understand, measure, and leverage the value of this new competitive advantage, they envisioned a new class of metrics that would quantify the value created by the many processes that take place within and across an organization.

The common problem that many organizations face is the inherent difficulty in linking their strategy, people, and performance through a unified metrics framework. Unfortunately, this is a problem whose size and complexity grows in tandem with the organization: the larger or more geographically diverse the company, the greater the gap between strategy and execution.

Another problem for many organizations is the difficulty they face in combining their disparate data assets into a single reference point. In most cases, an organization will base its decisions on Key Performance Indicators (KPIs) that draw data from different sources: ERP systems, financial spreadsheets, CRM software, and others. Not only do these different systems report on performance in different areas, the data they collect may not be collected, shared or defined in a consistent way across the company.

Without a shared performance management system with an agreed-to set of metrics, each department may suggest different priorities or provide different answers to the same question. For example: falling revenue from a particular vertical market may lead to widely divergent views on the best course of action: better training for the sales team, hiring more sales people; improving marketing, developing a new product, or discounting the current product.

This problem can also arise when a company lacks a standardized, commonly agreed-upon definition of its key reports, or when a particular metric is measured in different ways across the company. Different managers may use different metrics. Its executives use different key reports that may measure things related to the corporate strategy, but their relative importance and their relationship to other reports is not centrally defined.

A third problem occurs primarily when companies try to respond to severe, abrupt, or unexpected changes in market conditions. Should a company need to change its priorities, for example, from margins to customer service, or from acquisitions to cost-reductions, it will need to make operational changes within and across each functional area. Quite often, these changes tend to be short-term; as such, companies need to quickly understand how its processes operate and how they need to be altered. A company in this situation also needs metrics that can be updated frequently to let its decision-makers evaluate and re-evaluate their progress against new priorities at a faster pace. The company's performance management system needs to support these shifts in performance focus without needing to be re-wired.

Existing methods of providing business intelligence data deliver static reports on a predetermined schedule, typically containing an unwieldy jumble of data the vast majority of which is superfluous. Furthermore, because these reports are provided on a schedule insensitive to individual need and ignorant of real-time requirements, information often arrives too late to be useful. It would be advantageous to provide user-customizable business intelligence reports.

For the foregoing reasons, there is a need for an improved method of monitoring business intelligence data, linking strategy, people, and performance through a unified metrics framework, responding to sudden changes in business environment.

SUMMARY OF THE INVENTION

The present invention is directed to a business intelligence monitoring method and system.

In accordance with one aspect of the present invention, there is provided a method for monitoring one or more business intelligence indicators comprising the steps of: (i) generating a monitoring repository by: (a) selecting one or more functions from a collection of functions; the selected functions receiving the business intelligence indicators as inputs; (b) establishing thresholds for each of the business intelligence indicators, the thresholds defining states for the business intelligence indicators, each of the states having an assigned priority according to a status map; and (c) assigning a state for each of the business intelligence indicators based on the established state and the associated priority; (ii) updating the monitoring repository by: (a) retrieving a current value for each of the business intelligence indicators from a data source; (b) assigning the current values to the business intelligence indicators; and (c) determining the state for each of the business intelligence indicators based on the current value; and (iii) creating a report based on the updated monitoring repository.

In accordance with another aspect of the present invention, there is provided a business intelligence monitor system comprising: a manager for generating a monitor repository, the manager comprising: a creator for creating one or more business intelligence indicators; a threshold establisher for defining the thresholds of the business intelligence indicators; and a state definer for defining states based on the thresholds, and priorities assigned to the states; an updater for updating the monitor repository, the updater comprising: a data retriever for retrieving data from a data source for each of the business intelligence indicators; and a state assignor for assigning state to each of the business intelligence indicators based on the retrieved data.

In accordance with another aspect of the present invention, there is provided a business intelligence monitoring apparatus comprising: means for selecting one or more functions from a collection of functions; the selected functions receiving the business intelligence indicators as inputs; means for establishing thresholds for each of the business intelligence indicators, the thresholds defining states for the business intelligence indicators, each of the states having an assigned priority according to a status map; means for assigning a state for each of the business intelligence indicators based on the established state and the associated priority; means for retrieving a current value for each of the business intelligence indicators from a data source; means for assigning the current values to the business intelligence indicators; means for determining the state for each of the business intelligence indicators based on the current value; and means for creating a report based on the updated monitoring repository.

In accordance with another aspect of the present invention, there is provided a computer program product, comprising: a memory having computer-readable code embedded therein for monitoring business intelligence comprising: code means for selecting one or more functions from a collection of functions; the selected functions receiving the business intelligence indicators as inputs; code means for establishing thresholds for each of the business intelligence indicators, the thresholds defining states for the business intelligence indicators, each of the states having an assigned priority according to a status map; code means for assigning a state for each of the business intelligence indicators based on the established state and the associated priority; code means for retrieving a current value for each of the business intelligence indicators from a data source; code means for assigning the current values to the business intelligence indicators; code means for determining the state for each of the business intelligence indicators based on the current value; and code means for creating a report based on the updated monitoring repository.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

The present invention is directed to a business intelligence monitoring method and system.

Business intelligence delivers the information framework that enables one to understand the performance of a business. Business data sets, however, can contain tens of millions of consolidated rows of data and hundreds of thousands of categories.

Different business intelligence indicators contribute to the performance of a business. Users can monitor, analyze, and report on time-critical information through the creation, management, presentation, and delivery of cross-functional metrics based on business rules and calculations, for example, percentage growth and market share change.

The business intelligence indicators which are key to an area under consideration are the key performance indicators (KPI's). Those key performance indicators are usually integrated into the management picture. Examples for key performance indicators for a business include: employee satisfaction; supplier scorecards, customer profitability. Typically, the KPIs draw on a broad range of data source from many different areas of a business.

Based on the KPIs to be monitored, a user selects the KPI data value from a data source, such as a spreadsheet, a web page or a PowerPlay™ file. This selection can be done manually through the selection of a cell in a spreadsheet or through a wizard, for example a PowerPlay™ client. In the latter case, the PowerPlay™ client can act as a data pump. A data pump performs the functions of data acquisition, data transformation and data propagation. Those functions are typically much faster than the conventional conversion utilities. Here a data pump lets users acquire data from reports produced on other programs. A user may designate a group (IG) of related KPIs, or in general, a group of business intelligence indicators. A group of KPIs, in turn, can be a member of another group of indicators. Following is an example of KPIs and IG's.

EXAMPLE 1

Key Performance Indicators (KPIs) and Indicator Groups (IGs)

---

IG (European cities)
    KPI (German cities)
    KPI (French cities)
    IG (UK cities)
        KPI (Manchester)
        IG (London)
            KPI (Westminster)
            KPI (Chelsea)

---

Figure 1:
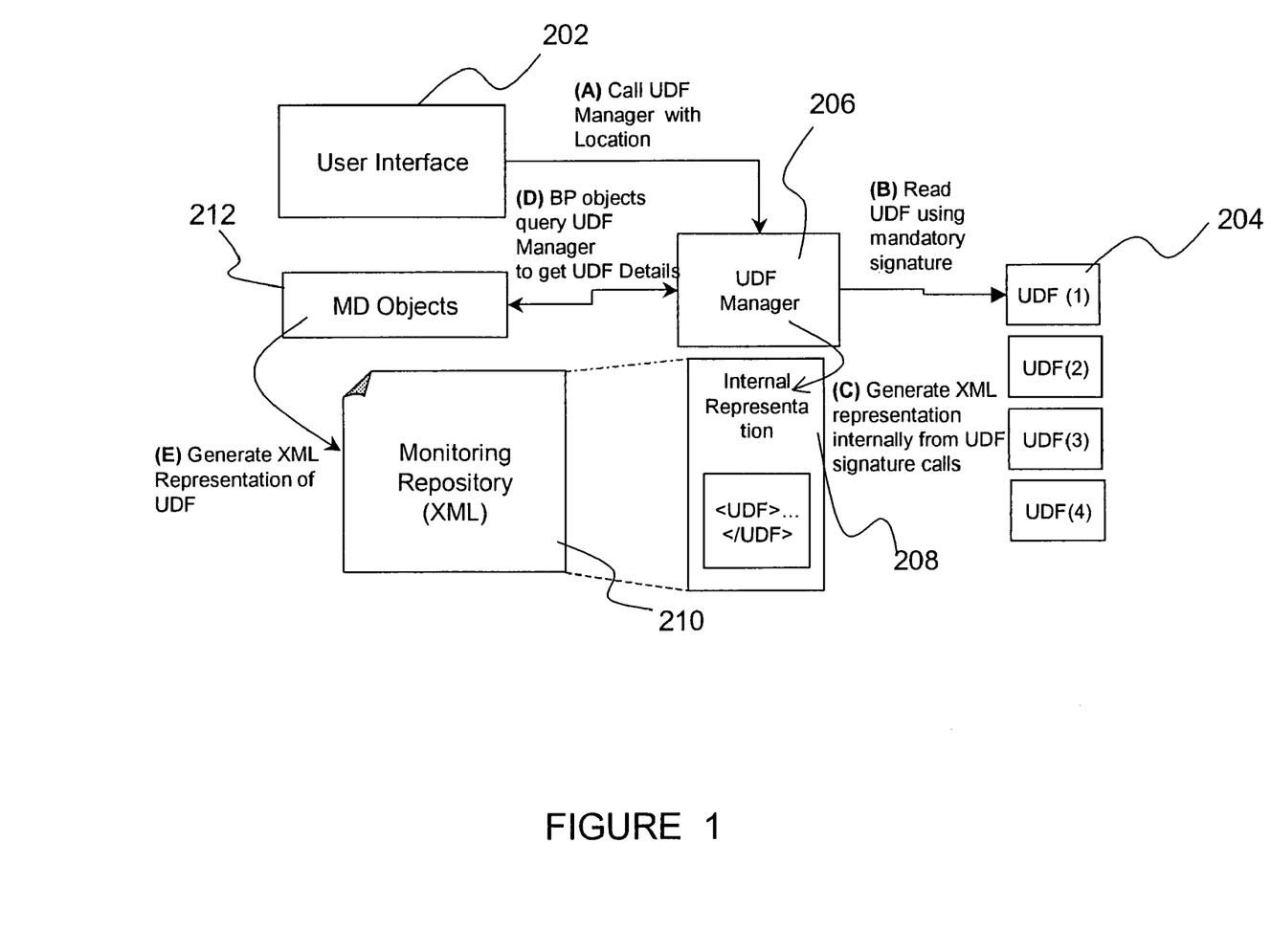
FIG. 1 illustrates an architectural overview of the business intelligence monitoring method according to the present invention.

Referring to FIG. 1, events such as the acquisition of the data or a user command at the user interface (202) will cause a monitoring repository (208) being generated. A collection of functions (204) is usually available for assembling the monitoring repository. The collection can be in the form of user defined functions (UDF) (204) or other forms. The monitoring repository in this embodiment is an internal Extended Mark-up Language (XML) presentation (208), it should be apparent to those skilled in the art that other forms of monitoring repository can perform the same function.

In the present embodiment, the monitoring repository in the form of XML representation is generated and managed by a functional manager (206). In the present embodiment it is called a UDF manager. The UDF manager can accept different kinds of UDF (204). Therefore, it functions as a socket (UDF manager) for different plug-ins (UDF). This architecture design has the advantage that one manager can accept different UDFs. Example 2 shows the architecture of the monitoring repository. Name of the objects and the number of the objects are presented as: object (number).

EXAMPLE 2

Monitoring Repository Architecture

--- monitoring repository
    Monitoring repository settings (1)
    Status definition (n)
    Indicator Group (IG) (n)
        IG state (1)
        KPI (n)
            state (1)
            UDF (1) (data pump)
            thresholds (1)
                threshold (n)
            state history (1)
                state (n)
            value (1) (actual value retrieved by data pump)
            value history (1)
                value (n)
            link to IG
        IG state history (1)
            IG state (n)

---

The XML representation is generated by UDF signatures. A signature is a collection of functions. Example 3 is a multi-call signature. Functions 1, 2 and 3 are responsible for establishing what information is in the UDF, and what other functions are exposed in the UDF library. Functions 4 and 5 perform the computation. In a single-call signature, for example, function 4 is absent.

EXAMPLE 3

Multi-Call Signature

1. GetFnCount( );
2. GetFnDetails( );
3. GetArgInfo( )
4. AddRow( )
5. Compute( )

Example 4 shows examples of the parameters and return values of the functions in Example 3.

EXAMPLE 4

UDF Signature Functions

--- long GetFnCount ( )
    returns number of non-mandatory functions in library
boolean GetFnDetails (int, fnIDX, fnDetails . . . )
    returns details of an individual function
    (Parameters: fnIDX = function index (integer, function);
    fnDetails = structure of information about function {int number
    of arguments; string name; . . . })
boolean GetArgInfo (int FnIDX, int ArgIDX, ArgDetails . . . )
    returns the details of an individual argument.
    (Parameters: FnIDX = function index; ArgIDX = argument index
    (integer argument); ArgDetails = structure of argument
    information {string name int type (int : front : string), . . . })
status compute( )
    returns a structure containing the result of computation and status
    information.

---

Referring to FIG. 1 and the Examples 3 and 4, the UDF Manager first calls the mandatory function GetFnCount to find out how many functions are on the UDF. Then for each function, call GetFnDetails to get its information and for each argument on the function, call GetArgInfo gets argument details, wherein the process is repeated and the argument and functions are stored in an XML representation. Example 5 illustrates this process in pseudo code. Example 6 illustrates the XML representation of the UDF manager. In Example 6, if the argument 'type' is 'multi', the library (DLL) must conform to 'multi-call' signature, and it the 'type' is 'single' then the library (DLL) must conform to 'single call' signature.

EXAMPLE 5

UDF Process in Pseudo-Code

--- for each function
    call GetFnDetails
        for each argument
            call GetArgInfo (store arg as XML)
        next argument
    (store function as XML)
next function

EXAMPLE 6

XML Representation of an UDF Signature

```
<UDF Lib='CogUDFR_BubbleUpRed', Type='multi'>
    <Arg name='weight', type='double'> </arg>
    <Arg name='priority', type='double'> </arg>
</udf>
```

Figure 2:
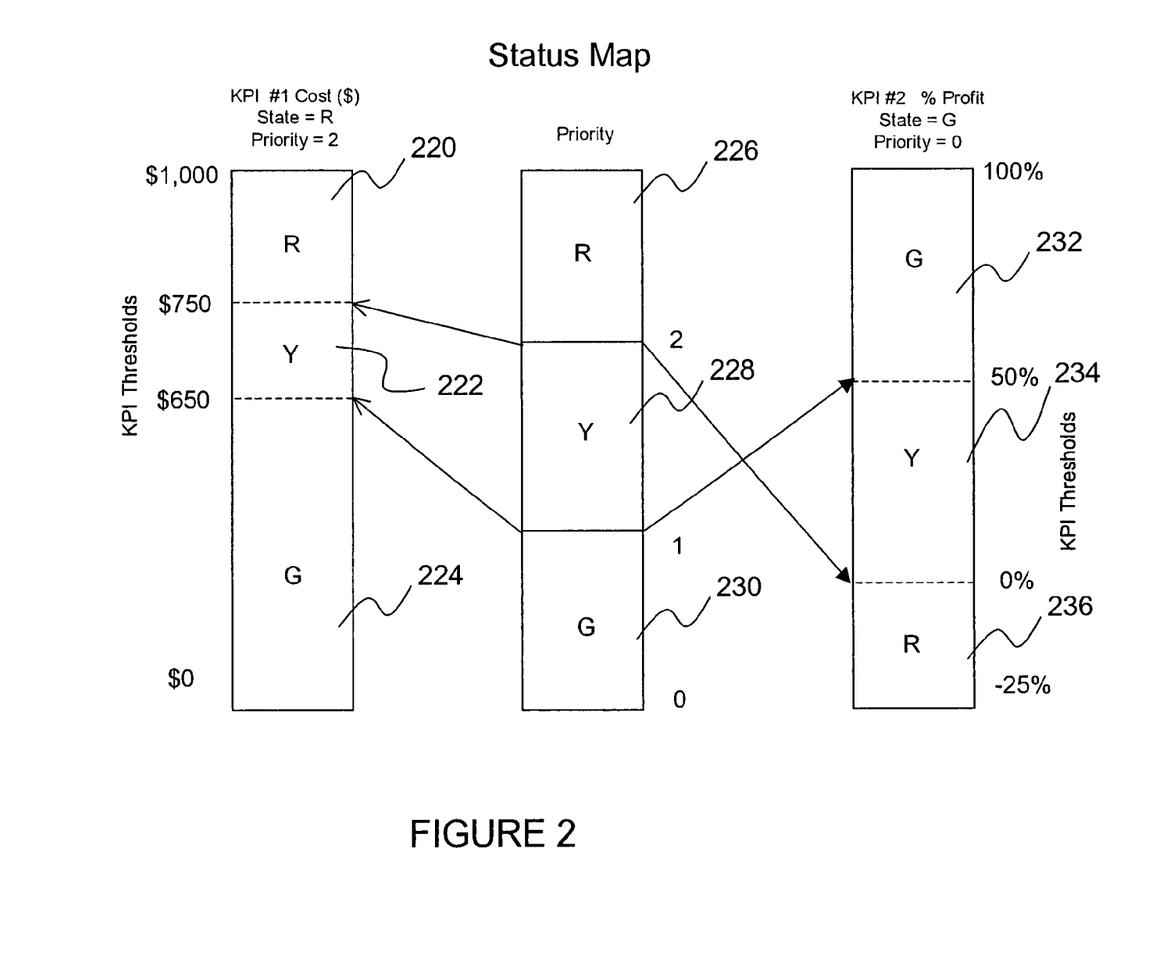
FIG. 2 illustrates a status map for mapping thresholds to the states and assigning the states to priorities.

Each of the KPI has a state, and a priority assigned to the state. Referring to FIG. 2, the objective is to map an arbitrary range of values to a consistent set of states for direct comparison of disparate metrics. As an example in FIG. 2, KPI 1, representing costs in a range of $0 to $1,000 has thresholds at $650 and $750. The thresholds divide the range into three states: G for $0 to $650; Y for $650 to $750 and R for $750-$1000. KPI 1 indicates that cost has a value of $800, therefore state R. KPI 2, representing percentage profit in a range of −25% to 100%, has thresholds at 0% and 50%, The thresholds divide the range into three states: G for 50% to 100%; Y for 0% to 50% and R for −12% to 0%. KPI 2 indicates that profit is at 75%, thus in G state.

As illustrated in FIG. 2, one status map can be applied to both KPI 1 and KPI 2 despite disparate metrics, enabling their states to be compared directly, such as R versus G rather than $800 versus 75%.

Figure 3:
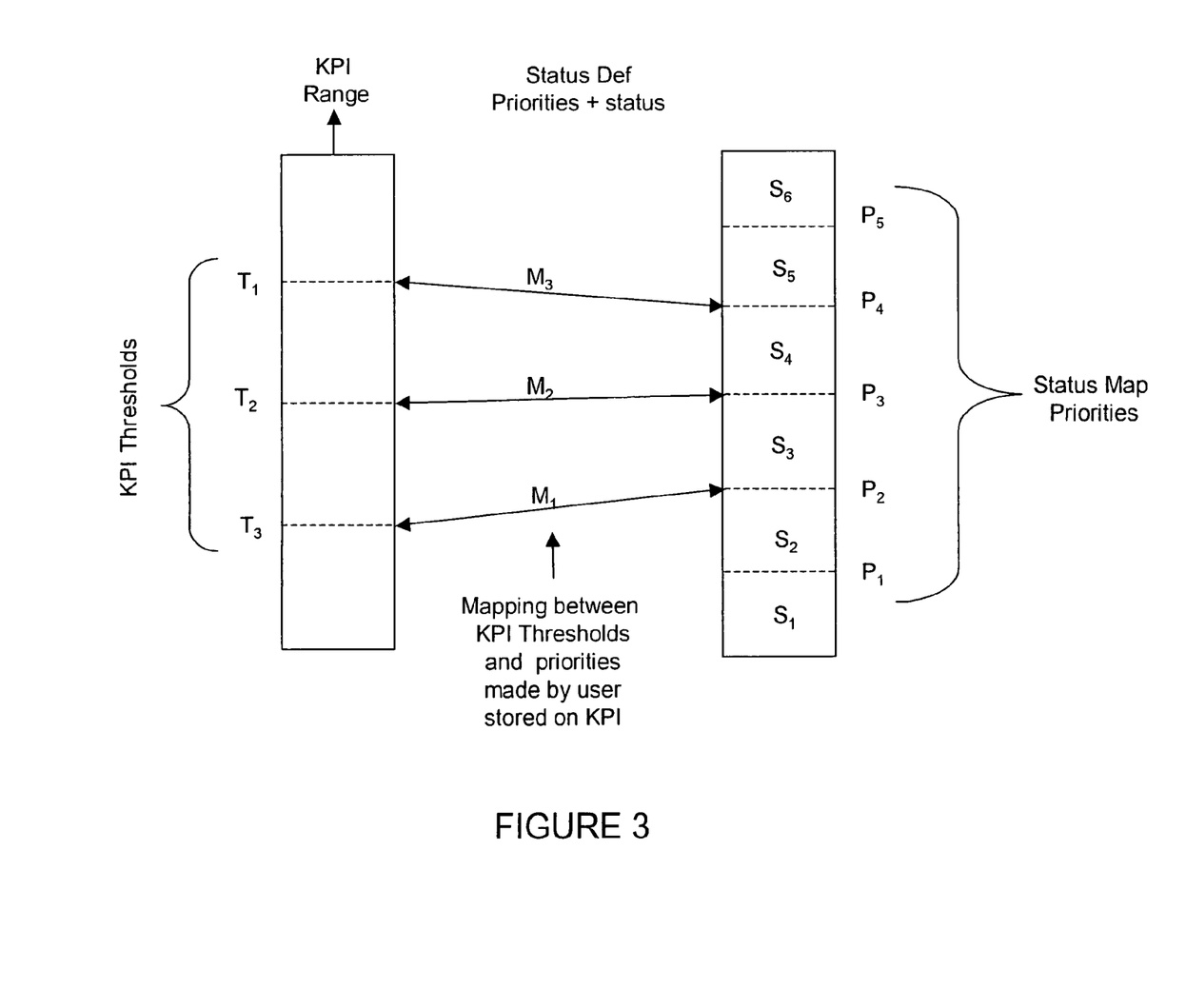
FIG. 3 illustrates the mapping between the thresholds and states.

Referring to FIG. 3, a status map can include an arbitrary number of states, $S_1$ to $S_6$ in this example. Each state is assigned a priority ($P_1$ to $P_5$), the priority being the metric used to compare any values applied to the status map for the purposes of elements such as rollup rules. The mapping of value ranges to a priority designation for a KPI is done through the thresholds for the KPI, as illustrated in FIG. 3. This mapping between KPI thresholds and priorities is made by the user, and stored.

Any given value of the KPI will fall between two thresholds. For consistency, the lower threshold applies. A KPI is assigned a priority associated with a threshold through a mapping according to the status map and the state is calculated from the associated priority.

Once the monitoring repository is generated, the current state of the business intelligence indicators can be captured through the updating of the KPIs with the actual values. As illustrated in Example 7, this process builds the content, performs the required calculations, applies roll-up rules, assigns states, updates the monitoring repository and provides an error log.

EXAMPLE 7

Process to Update the Monitoring Repository

1. Read monitoring repository;
2. Read status definitions to get status map;
3. For each Indicator Group (IG)
    a) For each KPI
        (i) if linked to IG evaluate IG;
        (ii) execute data pump UDF through UDF Manager to get actual value;
        (iii) update history with prior actual;
        (iv) apply thresholds;
        (v) apply actual to status map to get state;
        (vi) update history with prior state;
    b) Apply roll-up rules to all KPIs to calculate IG state;
    c) Update history with prior state;
4. Write monitoring repository with new status/values.

Roll-up rules defined as part of the monitoring repository, summarize the states of the KPIs into an indicator group state. For example, if the individual states are: R, Y, G, R, G, and G; then the highest roll-up rule could result R+Y+G+R+G+G=R.

Roll-up rules have an open architecture and are structured in a hierarchical manner. Examples of roll-up rules include: indicating the highest priority value encountered; indicating the lowest priority value encountered; and indicating weighted average.

After the monitoring repository is updated, a report can be created to capture the current state of the monitoring repository. The report, for example, can be in HTML format. It should be apparent to a person skilled in the art that many other formats can also be used for this purpose.

Report can be published in many forms to a person skilled in the art, for example on a website as an HTML document. Publishing an HTML report can be accomplished by updating the KPI tags with the corresponding information from the monitoring repository.

In addition, other forms of reports and error logs can be generated. Related URL links can be inserted or results customized to display desired elements within a web page.

Figure 4:
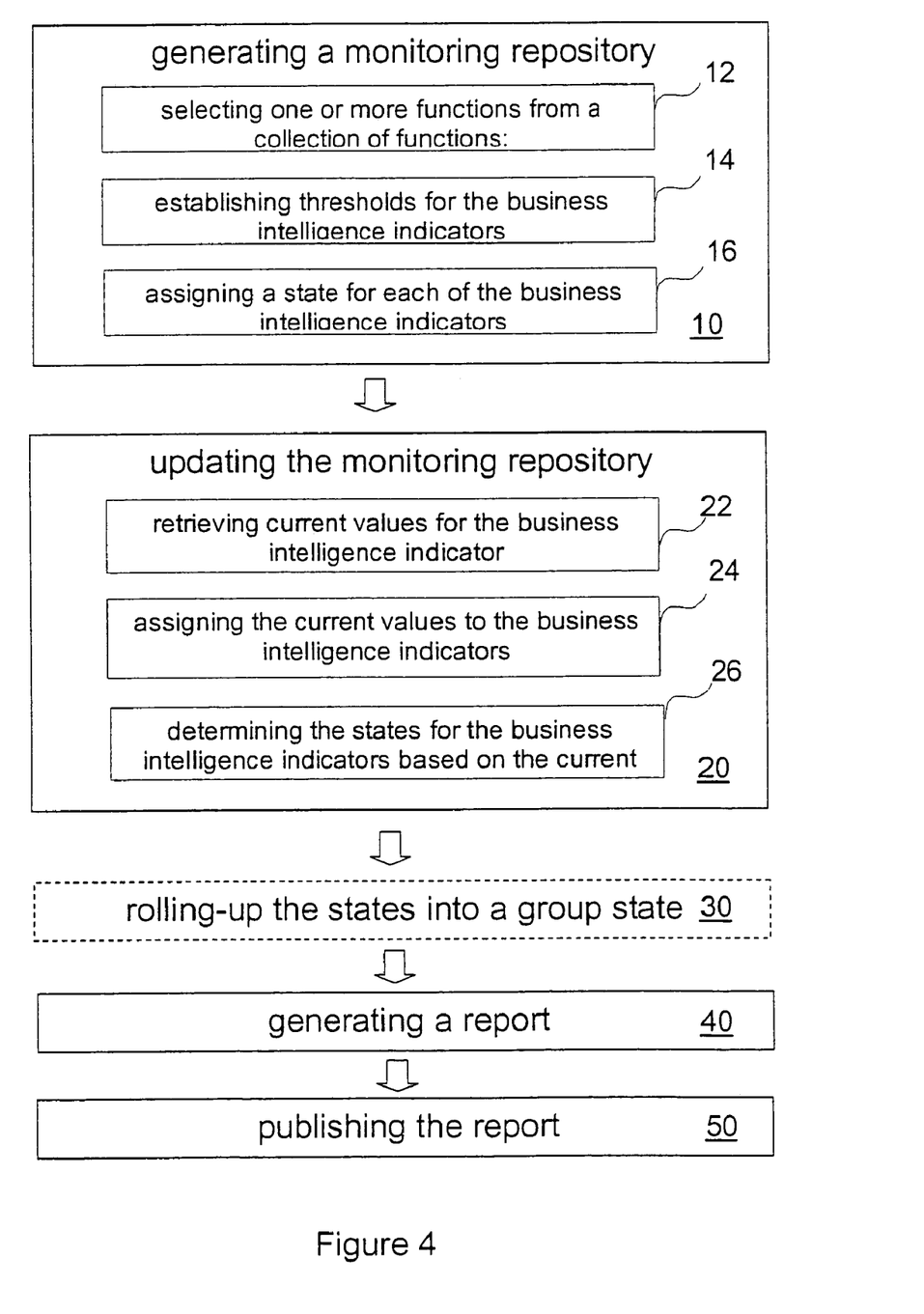
FIG. 4 is an overview of the business intelligence monitor method according to the present invention.

As illustrated in FIG. 4, the method for monitoring the business intelligence includes the steps of generating a monitoring repository (10), updating the monitoring repository (20).

The monitoring repository is generated by selecting one or more functions from a collection of functions (12), establishing thresholds for the business intelligence indicators (14) and assigning a state for each of the business intelligence indicators (16). The monitoring repository is updated by retrieving current values for the business intelligence indicator (22), assigning the current values to the business intelligence indicators (24) and determining the states for the business intelligence indicators based on the current (26).

In an embodiment of the present invention, the method further includes the steps of generating a report (40).

In another embodiment of the present invention, the method further includes the step of publishing the report (50).

In yet another embodiment of the present invention, the method further includes the step of rolling up the states of the individual intelligence indicators into a group indicator (30).

Figure 5:
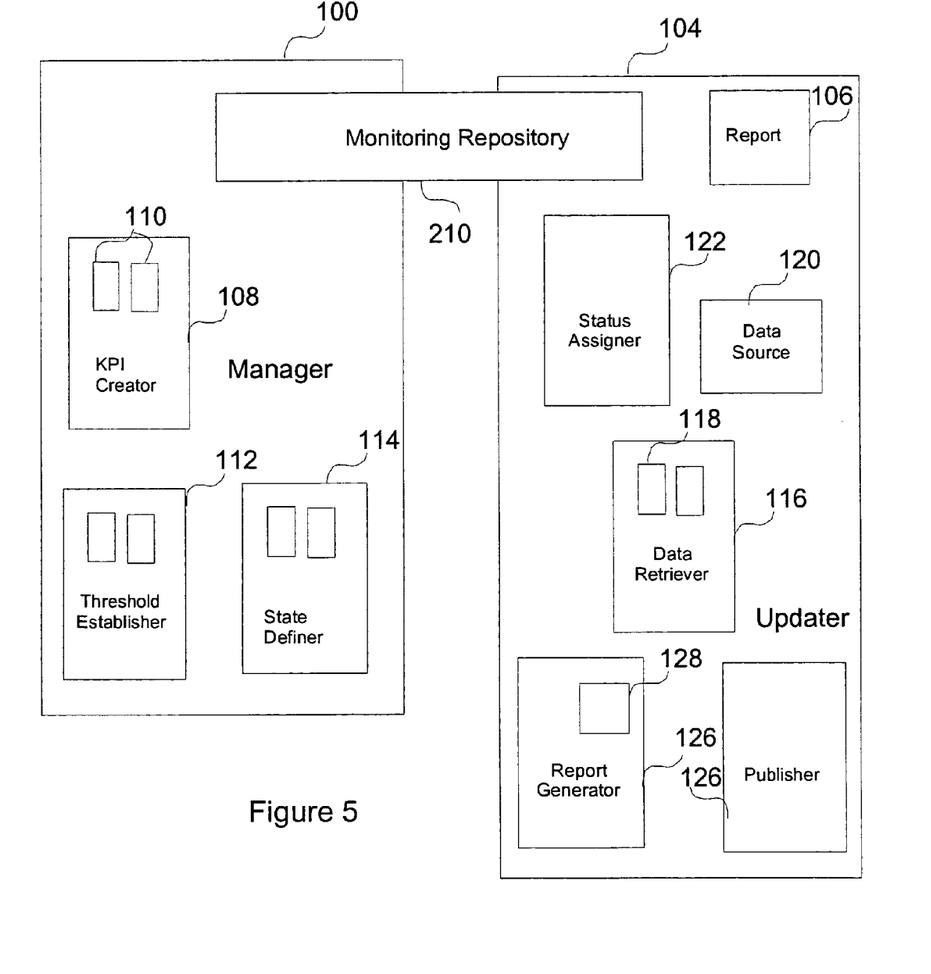
FIG. 5 is an overview of the business intelligence monitor system according to the present invention.

As illustrated in FIG. 5, the system for monitoring business intelligence includes a manager (100) for generating a monitor repository (210) and an updater (104) for updating the monitor repository (210). The manager (100) includes a key performance indicator (KPI, 110) creator (108) for creating one or more intelligence indicators (110), a threshold establisher (112) for establishing thresholds and a state definer (114) for defining the state.

The updater (104) includes a data retriever (116) for retrieving data (118) from a data source (120) for each KPI (110) and a status assignor (122) for assigning state to each KPI (110) based on retrieved data (118). The updater (104)

further includes a report generator (124) for generating a report (128), and a publisher (130) for publishing the report (106).

In another embodiment of the present invention, the manager (100) utilizes existing security infrastructure in applying to KPI (110) properties such as ownership, read, write and delete. For example, a team leader can view an KPI (110) displaying a threshold level for a performance area in his team, but would be prohibited from modifying or deleting that KPI (110); instead having to consult with the KPI (110) owner to make changes.

In yet another embodiment of the present invention, the method further includes one or more feedback elements to enable external input.

In yet another embodiment of the present invention, the method further includes one or more underlying data access elements to access foundational data.

In yet another embodiment of the present invention, the method further includes enabling access to a plurality of existing business information reporting infrastructures.

In yet another embodiment of the present invention, the enabled access further includes access to disparate reporting infrastructures.

The invention further enables the user to group critical business intelligence indicators together, and to present the result in a way suitable for the purpose of business intelligence evaluation. For example, if revenue does not meet the target, one can access the impact on the sales group.

The invention further enables the user to assign weighting to business intelligence indicators, such as weighting North American sales higher than Asia-Pacific sales.

Business intelligence indicators can be described and displayed on web pages with links to related information, such as web-based reports, other web sites or work documents.

Users can create a history of their business intelligence indicators over time and publish static images from business intelligence reporting clients to compare several different business intelligence indicators or dimensions of data.

In addition, users can publish trend information incorporating a temporal dimension, easily update and re-publish when the input date is refreshed, publish the display and output, and annotate in a web display.

The invention repositions control at an appropriate level, providing users with responsibility-specific business intelligence monitoring, empowering them with an ability to create customized reports, designed by and for those who use them.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A method for monitoring business intelligence indicators comprising the steps of:
   (i) generating a monitoring repository by:
   a) generating an executable function from a plurality of executable functions by an executable function manager; the generated executable function receiving the business intelligence indicators as inputs, the business intelligence indicators including a state, and a state history;
   b) incorporating the business intelligence indicators into indicator groups, the indicator groups having an indicator group state, and an indicator state history;
   c) establishing thresholds for each of the business intelligence indicators, the thresholds defining states for the business intelligence indicators, each of the states having an assigned priority according to a status map; and
   d) assigning a state for each of the business intelligence indicators based on the established state and the assigned priority;
   (ii) updating the monitoring repository by:
   a) retrieving a current value for each of the business intelligence indicators from a data source through data acquisition, data transformation, or data propagation;
   b) assigning the current values to the business intelligence indicators; and
   c) determining and comparing the state for each of the business intelligence indicators based on the current value;
   (iii) creating a report based on the updated monitoring repository.

2. The method according to claim 1, wherein the state is based on disparate metrics.

3. The method according to claim 1, wherein the indicator group further comprises one or more other indicator groups.

4. The method according to claim 1, further comprising the step of publishing the report.

5. The method according to claim 1, further comprising the step of:
   rolling-up the states of the business intelligence indicators of an indicator group into a group state.

6. The method according to claim 5, wherein a change of the group state results in an alert.

7. The method according to claim 1, wherein the plurality of executable functions is user defined functions (UDF).

8. The method according to claim 1, wherein the plurality of executable functions is part of a dynamic linked library.

9. The method according to claim 1, wherein the report is in HTML format.

10. The method according to claim 9, wherein the report is published by updating tags in the HTML format report.

11. The method according to claim 1, wherein a change of the state results in an alert.

12. A business intelligence monitor system comprising:
   a manager for generating a monitor repository, the manager comprising:
   first a creator for creating business intelligence indicators, the business intelligence indicators including a state and a state history;
   a divider for incorporating the business intelligence indicators into indicator groups, the indicator groups having an indicator group state and an indicator state history;
   a threshold establisher for establishing thresholds for each of the business intelligence indicators, the thresholds defining states for the business intelligence indicators, each of the states having an assigned priority according to a status map; defining thresholds of the business intelligence indicators; and
   a first state definer for assigning a state for each of the business intelligence indicators based on the established state and the assigned priority;

an updater for updating the monitor repository, the updater comprising:
- a data retriever for retrieving current value for each of the business intelligence indicators from a data source through data acquisition, data transformation, or data propagation; and
- a second state assignor for assigning the current values to the business intelligence indicators; and
- a comparator for determining and comparing the state for each of the business intelligence indicators based on the current value and a second creator for creating a report based on the updated monitoring repository.

13. The business intelligence monitor system according to claim 12, further comprising a report generator for generating a report.

14. The business intelligence monitor system according to claim 13, wherein the report is in HTML format.

15. The business intelligence monitor system according to claim 14, wherein the report is published by updating tags in the HTML format report.

16. The business intelligence monitor system according to claim 12, further comprising a publisher for publishing the report.

17. The business intelligence monitor system according to claim 12, wherein the state is based on disparate metrics.

18. The business intelligence monitor system according to claim 12, further comprising an upgrader for rolling-up the states of the business intelligence indicators of an indicator group into a group state.

19. The business intelligence monitor system according to claim 12, wherein the plurality of executable functions is user defined functions (UDF).

20. The business intelligence monitor system according to claim 12, wherein the plurality of executable functions is part of a dynamic linked library.

21. A business intelligence monitoring apparatus comprising:
- means for generating an executable function from a plurality of executable functions; the generated function receiving the business intelligence indicators as inputs, the business intelligence indicators including a state, and a state history;
- means for incorporating the business intelligence indicators into indicator groups, the indicator groups having an indicator group state, and an indicator state history;
- means for establishing thresholds for each of the business intelligence indicators, the thresholds defining states for the business intelligence indicators, each of the states having an assigned priority according to a status map;
- means for assigning a state for each of the business intelligence indicators based on the established state and the assigned priority;
- means for retrieving a current value for each of the business intelligence indicators from a data source;
- means for assigning the current values to the business intelligence indicators;
- means for determining the state for each of the business intelligence indicators based on the current value; and
- means for creating a report based on the updated monitoring repository.

22. The business intelligence monitoring apparatus according to claim 21, further comprising:
- means for rolling-up the states of the business intelligence indicators of an indicator group into a group state.

23. The business intelligence monitoring apparatus according to claim 21, further comprising:
- means for publishing the report.

24. The business intelligence monitoring apparatus according to claim 21, wherein the state is based on disparate metrics.

25. The business intelligence monitoring apparatus according to claim 21, wherein the plurality of executable functions is user defined functions (UDF).

26. The business intelligence monitoring apparatus according to claim 21, wherein the plurality of executable functions is part of a dynamic linked library.

27. The business intelligence monitoring apparatus according to claim 21, wherein the report is in HTML format.

28. The business intelligence monitoring apparatus according to claim 27, wherein the report is published by updating tags in the HTML format report.

29. A storage medium readable by a computer encoding computer program for execution by the computer to carry out a method for monitoring business intelligence indicators, the computer program comprising:
- code means for generating an executable function from a plurality of executable functions; the generated function receiving the business intelligence indicators as inputs, the business intelligence indicators including a state, and a state history;
- code means for incorporating the business intelligence indicators into indicator groups, the indicator groups having an indicator group state, and an indicator state history;
- code means for establishing thresholds for each of the business intelligence indicators, the thresholds defining states for the business intelligence indicators, each of the states having an assigned priority according to a status map;
- code means for assigning a state for each of the business intelligence indicators based on the established state and the assigned priority;
- code means for retrieving a current value for each of the business intelligence indicators from a data source;
- code means for assigning the current values to the business intelligence indicators;
- code means for determining the state for each of the business intelligence indicators based on the current value; and
- code means for creating a report based on the updated monitoring repository.

30. The storage medium according to claim 29, wherein the state is based on disparate metrics.

31. The storage medium according to claim 29, further comprising code means for publishing the report.

32. The storage medium according to claim 29, further comprising code means for rolling-up the states of the business intelligence indicators of an indicator group into a group state.

33. The storage medium according to claim 29, wherein the plurality of executable functions is user defined functions (UDF).

34. The storage medium according to claim 29, wherein the plurality of executable functions is part of a dynamic linked library.

35. The storage medium according to claim 29, wherein the report is in HTML format.

36. The storage medium according to claim 35, wherein the report is published by updating tags in the HTML format report.

* * * * *